B. W. JACKSON.
PLOW.
APPLICATION FILED OCT. 5, 1918.

1,308,360.

Patented July 1, 1919.
2 SHEETS—SHEET 1.

Inventor
B. W. Jackson.
By Lacey & Lacey, Attorneys

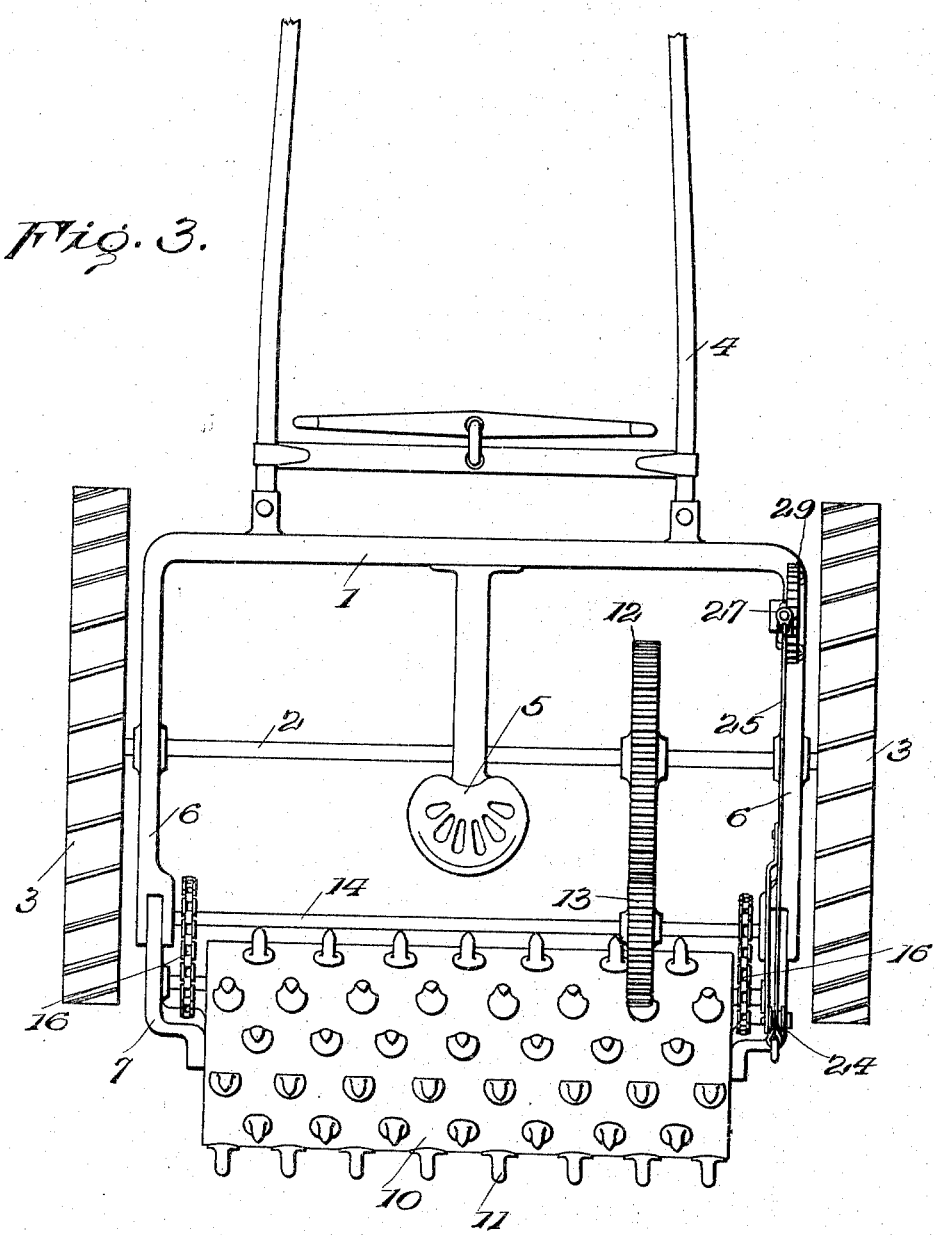

UNITED STATES PATENT OFFICE.

BIRNEY W. JACKSON, OF PHILADELPHIA, PENNSYLVANIA.

PLOW.

1,308,360.  Specification of Letters Patent.  Patented July 1, 1919.

Application filed October 5, 1918. Serial No. 257,035.

*To all whom it may concern:*

Be it known that I, BIRNEY W. JACKSON, a citizen of the United States, residing at Philadelphia, in the county of Philadelphia and State of Pennsylvania, have invented certain new and useful Improvements in Plows, of which the following is a specification.

This invention relates to agricultural machines and has particular reference to machines for plowing or breaking up the soil so that it may be quickly brought into proper condition for planting. The invention is illustrated in the accompanying drawings and consists in certain novel features which will be hereinafter first fully described and then particularly pointed out in the claims.

In the drawings—

Fig. 3 is a plan view of the machine.

Figure 1:
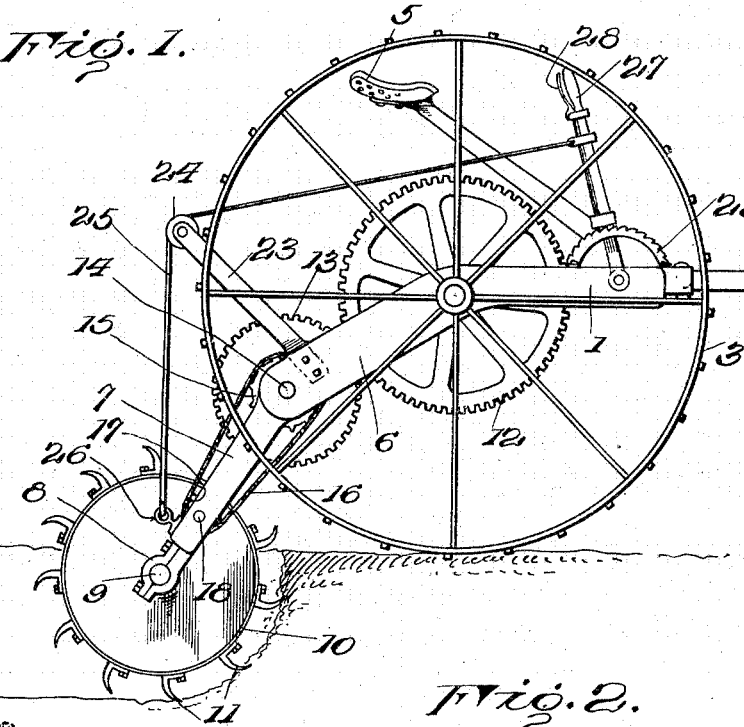
Figure 1 is an end elevation of a machine embodying my improvements.
Figure 2:
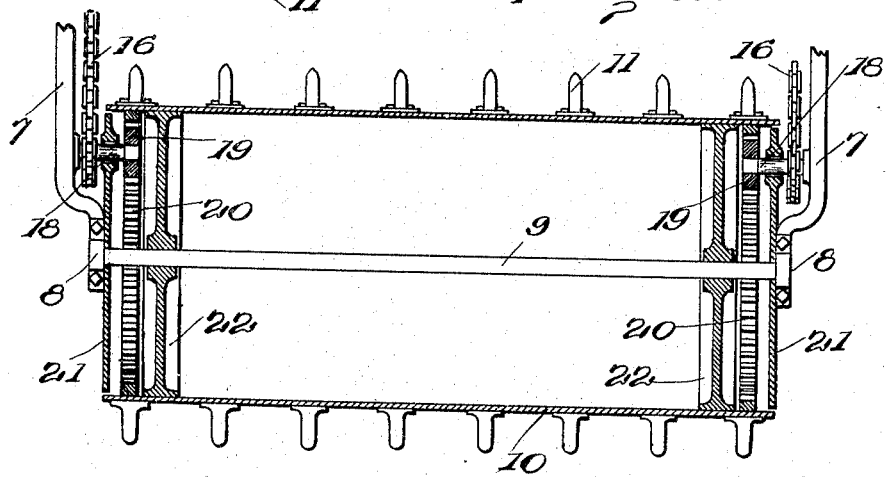
Fig. 2 is a longitudinal section through the drum or ground-treating member.

In carrying out my invention, I employ a frame 1 which may conveniently be a U-shaped bar in the end members of which an axle 2 is rotatably mounted, ground wheels 3 being secured upon the ends of said axle. The machine may be propelled in any convenient manner but for illustrative purposes I have shown shafts 4 to which a draft animal may be hitched and have also shown a seat 5 upon the frame to support a driver in a convenient position for adjusting the drum and controlling the draft animal.

The rear portions of the end or side members of the main frame 1 may be turned downwardly, as shown at 6, and to the extremities of said members I pivotally attach the supporting arms 7 having bearings 8 at their lower ends for the shaft or axle 9 of the soil-treating drum or member. The drum is preferably a cylindrical shell 10 of any material, preferably metal, possessing the necessary strength without excessive weight and a plurality of teeth or shares 11 which are secured to the circumferential surface of the drum in any preferred manner. These teeth or shares may be of any desired shape and are illustrated as teeth having their shanks or ground-engaging members curved and having basal portions riveted or bolted to the periphery of the drum. The points of the teeth or shares are to be turned in such direction that on the forward movement of the drum they will penetrate the soil and break up the same. Gearing is provided to cause the drum to rotate in a direction contrary or opposite to the direction of rotation of the ground wheels 3 and more rapidly than the speed of the ground wheels so that the drum will not merely engage and ride over the soil but will actually penetrate and break up the same.

Secured to the axle 2 is a driving gear 12 which meshes with a gear 13 upon a countershaft 14 which is journaled in the ends of the down-turned portions 6 of the main frame and also constitutes the pivot for the supporting arms 7. Upon the countershaft 14 near the ends thereof are sprocket wheels 15 around which are trained chains 16 which are also trained around sprocket pinions 17 on stub shafts 18 which are journaled at their outer ends on the supporting arms 7 and are equipped at their inner ends with spur pinions 19 meshing with internal gears 20 on the inner surface of the drum 10 adjacent the ends thereof. The stub shafts 18 are also supported by cap plates 21 which fit closely within the ends of the drum 10 and thereby prevent the entrance of dirt into the drum and the consequent choking or excessive wear of the pinions 19 and the gears 20. Reinforcing members 22 may be secured in the drum so as to prevent collapse of the peripheral wall thereof and resist the torsional strain imposed thereon by the pinions 19 and the gears 20.

Upon one of the supporting arms 6 near the rear end thereof, I secure a standard or post 23 having a guide pulley 24 at its upper end and over the said pulley passes a cable or other flexible connection 25 having its rear end secured to an eye 26 upon the rear end of the supporting arm 7 and its front end attached to an adjusting lever 27 which is fulcrumed upon the frame 1 and is equipped with a latch 28 coöperating with a rack 29 whereby the lever may be held in a set position.

It will be readily seen from the foregoing description, taken in connection with the accompanying drawings, that as the machine is drawn over a field the axle 2 will rotate in unison with the ground wheels and the driving gear 12 will be thereby set in motion. The motion of the driving wheel 12 will be transmitted directly to the gear 13 and through the same to the countershaft 14 so that said shaft will rotate in a direction opposite to the rotation of the axle and the sprocket wheels carried thereby will, of course, rotate in the same direction as the countershaft. The rotation of the countershaft will be transmitted through the sprocket chains to the stub shafts 18 and the internal gearing which operatively connects said shafts with the drum will cause the drum to rotate in the opposite direction to the rotation of the ground wheels so that the ground-engaging teeth or shares will operate in opposition to the travel of the machine, consequently not only engaging the soil but positively breaking up the same. Through the manipulation of the hand lever 27 in an obvious manner, the drum may be set to travel at any desired depth and may even operate at such a depth that its axle 9 will be below the level of the surface of the field which has not been turned over. Of course, when the plow is to be driven over a road, the drum may be raised to a point above the surface of the road so that it will not operate thereon and damage the road.

My improved machine is exceedingly simple and compact in the construction and arrangement of its parts and is very efficient in operation. The drum may, of course, be formed in one or more sections and may have any surface configuration considered desirable for the work to be done.

Having thus described the invention, what is claimed as new is:

1. In an agricultural implement, the combination of a wheeled frame, a drum supported upon the rear end of the frame, an internal gear upon the drum at the end of the same, a stub shaft mounted upon the frame, a pinion upon said shaft meshing with said internal gear, a countershaft mounted upon the frame, and means whereby said countershaft will be driven by the wheels of the frame in a direction contrary to the travel of said wheels and the stub shaft will be driven in the same direction as the countershaft.

2. In an agricultural implement, the combination of a main frame, an axle rotatably mounted in said frame, ground wheels on the ends of the axle, a driving gear on the axle, a countershaft upon the frame in rear of the axle, a drum supported from the rear end of the frame, a plurality of ground-engaging members carried by the peripheral surface of said drum, a gear upon the countershaft meshing with the driving gear upon the axle, sprocket wheels on the countershaft, internal gears at the ends of the drum, stub shafts on the frame adjacent the ends of the drum, sprocket pinions on the outer ends of said shafts, chains trained around said sprocket pinions and the sprocket gears on the countershaft, and pinions on the inner ends of said shafts meshing with the internal gears on the drum.

3. In an agricultural machine, the combination of a main frame, a wheeled axle rotatably mounted in the frame, supporting arms pivoted to the rear end of the frame, a drum supported by and between said arms, internal gears in the ends of the drum, stub shafts mounted in the supporting arms, pinions on said shafts meshing with the said internal gears, cap plates fitting in the ends of the drum and around the stub shafts, and gearing operatively connecting the stub shafts with the countershaft and the countershaft with the axle.

In testimony whereof I affix my signature.

BIRNEY W. JACKSON. [L. s.]

Copies of this patent may be obtained for five cents each, by addressing the "Commissioner of Patents, Washington, D. C."